US006882715B2

(12) United States Patent
Hom

(10) Patent No.: US 6,882,715 B2
(45) Date of Patent: Apr. 19, 2005

(54) METHOD AND APPARATUS FOR COMMUNICATION WITH A GATE ENTRY CONTROLLER AND PROVIDING SECURE COMMUNICATION

(75) Inventor: Wayne C. Hom, Rancho Santa Margarita, CA (US)

(73) Assignee: The Chamberlain Group, Inc., Elmhurst, IL (US)

( * ) Notice: Subject to any disclaimer, the term of this patent is extended or adjusted under 35 U.S.C. 154(b) by 136 days.

(21) Appl. No.: 10/017,530

(22) Filed: Dec. 13, 2001

(65) Prior Publication Data

US 2003/0112939 A1 Jun. 19, 2003

(51) Int. Cl.[7] .............................. H04M 1/60; H04M 1/00
(52) U.S. Cl. .................. 379/167.07; 379/160; 379/165; 379/167.01; 379/167.11; 379/102.06
(58) Field of Search ................................ 379/159, 160, 379/165, 167.01, 167.04, 167.05, 167.06, 167.07, 167.12, 167.14, 167.15, 102.01, 102.06, 387.01, 387.02; 381/67, 316

(56) References Cited

U.S. PATENT DOCUMENTS

| | | | | |
|---|---|---|---|---|
| 3,917,911 A | * | 11/1975 | Lesher ................... | 379/102.06 |
| 4,823,380 A | * | 4/1989 | Kohen et al. ........... | 379/387.02 |
| 4,937,855 A | * | 6/1990 | McNab et al. .......... | 379/102.06 |
| 5,046,083 A | * | 9/1991 | Trell ...................... | 379/102.06 |
| 5,321,742 A | * | 6/1994 | Stevens .................. | 379/102.06 |
| 5,475,741 A | * | 12/1995 | Davis et al. ............ | 379/102.06 |
| 5,598,456 A | * | 1/1997 | Feinberg ...................... | 379/42 |
| 5,784,446 A | * | 7/1998 | Stuart ..................... | 379/167.11 |
| 5,982,861 A | * | 11/1999 | Holloway et al. ...... | 379/102.06 |
| 6,041,106 A | * | 3/2000 | Parsadayan et al. ... | 379/102.06 |

* cited by examiner

*Primary Examiner*—Quoc Tran
(74) *Attorney, Agent, or Firm*—Fitch, Even, Tabin & Flannery

(57) ABSTRACT

A security system and method is disclosed for use with a security gate entry system that uses a telephone or other communication system at a security gate for communication by a person seeking entry into the secure area with a residence or other unit in the secure area. When a person seeking entry to a limited access area calls on the voice communication system, provided at a security gate entry system a residence or other unit within the secure complex the party answering the call has the option of disguising or altering the voice characteristics of the person answering the call. The system in a preferred embodiment shifts the audio characteristics of a female or child's voice to that of an adult male.

16 Claims, 3 Drawing Sheets

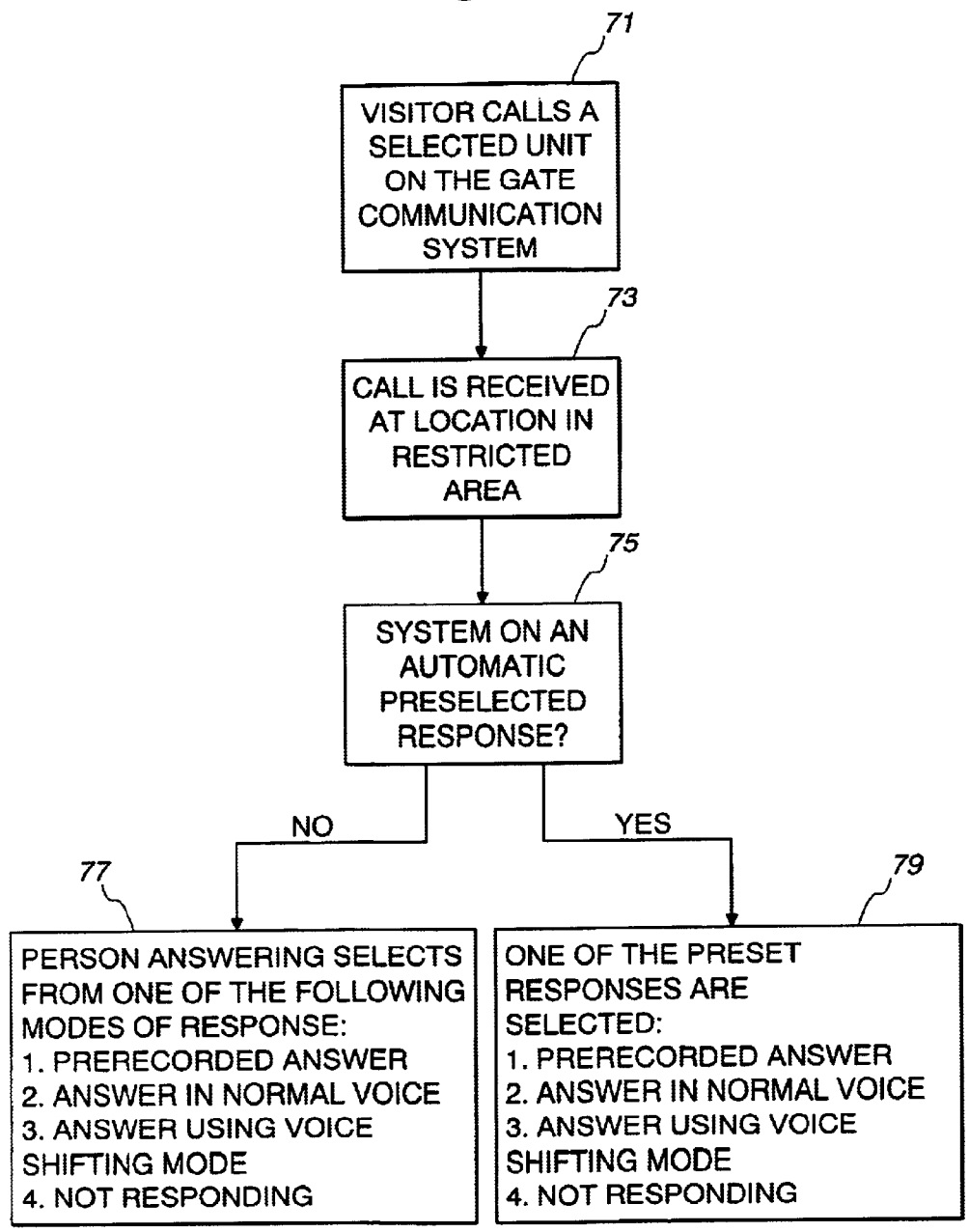

METHOD AND APPARATUS FOR COMMUNICATION WITH A GATE ENTRY CONTROLLER AND PROVIDING SECURE COMMUNICATION

FIELD OF THE INVENTION

The present invention relates to communication entry systems. More particularly to a communication entry system that includes security features.

BACKGROUND OF THE INVENTION

Systems for access control often consist of a centralized unit that monitors and controls the operation of a number of remote units. The systems are commonly used with gated communities, restricted access apartment complexes or in other situations where there is a need or desire to create a restricted access area. These systems are also often installed and used for single-family residences. The remote units generally control access to a restricted or secure area and require an individual seeking entry into the secure area to interact with the remote unit located at a gate or entry barrier by providing appropriate codes or to call on a telephone or similar system a person at another unit connected to the system with authority and means to allow the individual seeking access to enter. The remote unit is generally positioned at a gate, door or similar barrier at a portal or opening into the restricted or secure area and the unit called often is in an apartment or residence within the restricted area. Once the remote unit has been appropriately activated it opens the door or gate to allow access. U.S. Pat. Nos. 5,854,831 and 6,041,106, incorporated herein by reference and owned by the same entity that owns the present application, describe and claim two versions of remote units currently available.

One of the problems with these systems, in particularly, those used in residential dwelling units with restricted access is that when a person arrives at the gate and calls seeking access often there may not be an adult in the residence. Thus, an adolescent or even younger child may answer the call from the gate. This can create security problems since, as soon as the child answers, the person at the gate can use this fact to their advantage if they have a bad intent. They may try to persuade the child to give them entry into the complex whereas with an adult they would not try to do so. Additionally, since they have determined an adult is not on the premises, they may try to use this fact to their advantage to commit some illegal act. Even if they have no illegal intent they may still try to use the fact to allow them to gain entry to conduct some other activity, such as sales with which the residents would prefer not to be bothered. Also, a woman alone in an apartment or house might not want to reveal her gender when answering a call from someone at the front gate of her apartment or housing complex. Likewise if it is a gated security system at a single-family residence the problem is even more serious for the obvious reasons.

Thus, what is needed is a communication security system that provides optional security features for a security gate controlled entry system in which a person seeking entry into a secure area contacts a unit within the complex over an audio communication system of the complex. A system that gives the option to a resident or occupant of one of the units to disguise his or her age or sex as well as providing other security features.

SUMMARY

It is an objective of the present invention to provide a communication security system for a restricted access area gate controlled entry system that provides communication security options to occupants of the restricted access area when communicating with an individual seeking admittance to the restricted access area. It is a further objective to provide, as part of the communication security system, an occupant of the restricted access area with the ability to mask their age and/or sex when communicating with an individual attempting to obtain access.

These and other objectives are accomplished by providing an audio security system for a barrier entry communication system including: a) a movable security barrier that limits access to a restricted area to persons having appropriate authorization to enter the secured area; b) a barrier security apparatus operable to open said security barrier on activation after appropriate authorization; c) a first voice communication device located at said security barrier and whereby an individual at said security barrier desiring access to the restricted area can contact a location capable of granting authorization to enter the restricted area through said barrier; d) a second voice communication device at a location within said restricted access area capable of granting authorization to enter, operatively connected to said first voice communication device; and e) a voice modification mechanism available to said second voice communication device whereby a person at said second communication device when answering a call from said first voice communication device can modify the audio characteristics of a response for security purposes.

BRIEF DESCRIPTION OF THE DRAWINGS

The invention will be better understood by an examination of the following description, together with the accompanying drawings, in which:

FIG. 4 is a flow chart of the operation of the method of the present invention.

DETAILED DESCRIPTION OF THE PREFERRED EMBODIMENT

Figure 1:
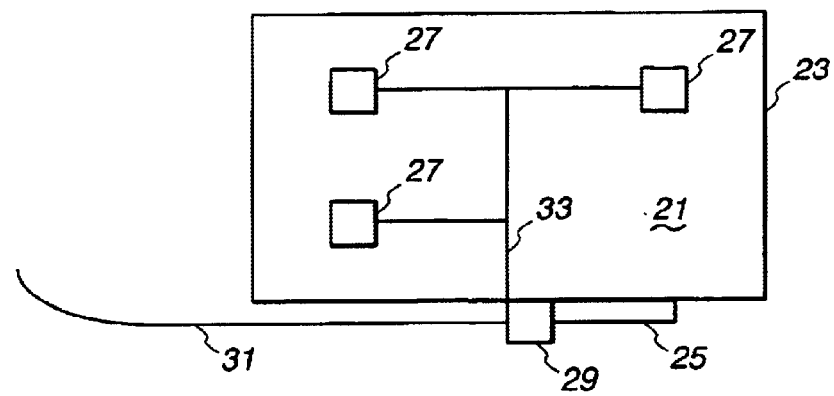
FIG. 1 is a schematic block type diagram of a limited access area where the present invention might be used.

FIG. 1 provides a schematic type block type diagram of the overall context in which a preferred embodiment of the present invention would work. The present invention works in conjunction with a system that limits and controls access to a restricted area or complex 21. Typically, a barrier such as a fence or stonewall 23 encloses restricted area or complex 21. Such a restricted area can be a gated community, secure apartment complex or some similar complex. An entryway 25 has a gate that limits access into the restricted area 21. Typically a person arriving at the entryway 25 will call on a communication system 29 a residence or other location 27 within the complex to obtain access to the restricted area 21. The communication system in a basic form will consist of a two way communication terminal 29 located at entryway 25. The two way communication terminal will connect to a communication system of the secure area and allow one at the gate to call any of the individual units within the complex. Each unit will have its own two-way communication device connected into the communication system.

In a preferred embodiment the terminal 29 will connect into the public telephone lines coming into the complex.

Thus, when a person at the entryway 25 calls on the terminal 29 the call would transmit over the telephone lines 33 of the complex 21 to the particular residence or location 27 dialed within the complex. The call would be received by a telephone in the unit called.

Figure 2:
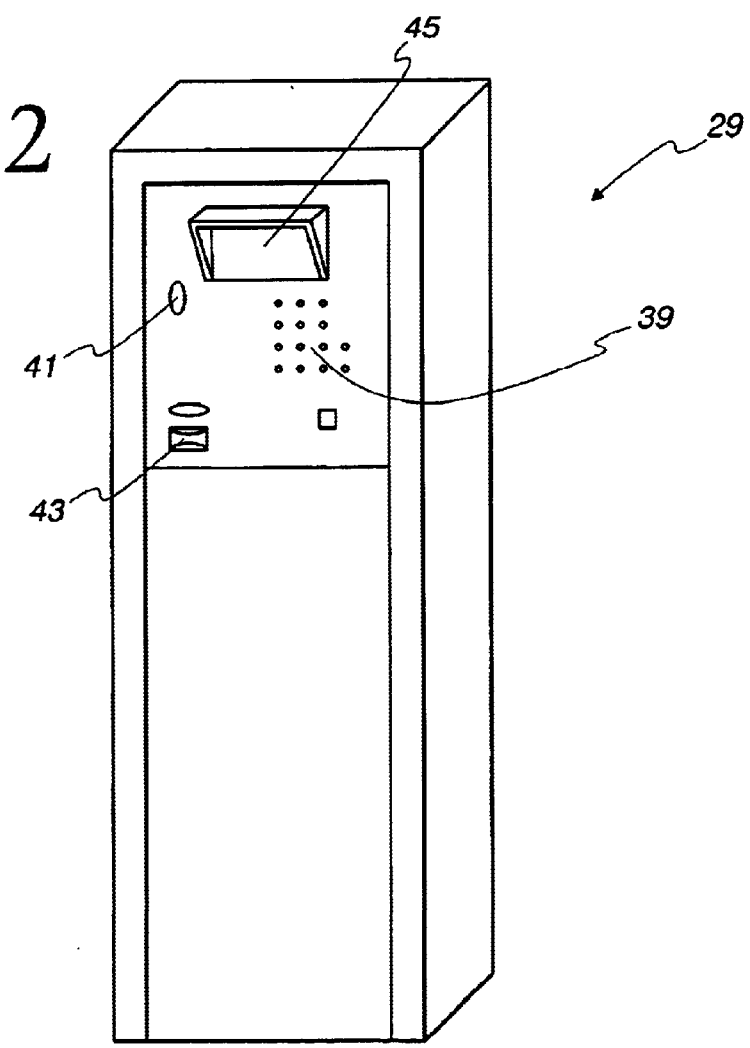
FIG. 2. is a view of the front of a communication unit that maybe used with the present invention.

One version of terminal 29 depicted in FIG. 2 is in part described in U.S. Pat. Nos. 5,854,831 and 6,041,106 referenced above and incorporated by reference herein. The person seeking entry into the complex would enter the telephone number on keypad 39 of unit 27 in the complex 21 he or she is trying to contact. The person would speak into microphone 41 located in unit 29 and hear a response from speaker 43. The person would have the option of determining the telephone number of a unit 27 he or she wants to contact by keying in identifying information on keypad 39 and seeing the desired number on screen 45. However, any number of different types of two-way communication units, including a telephone or intercom can be used and the invention still practiced.

Figure 3:
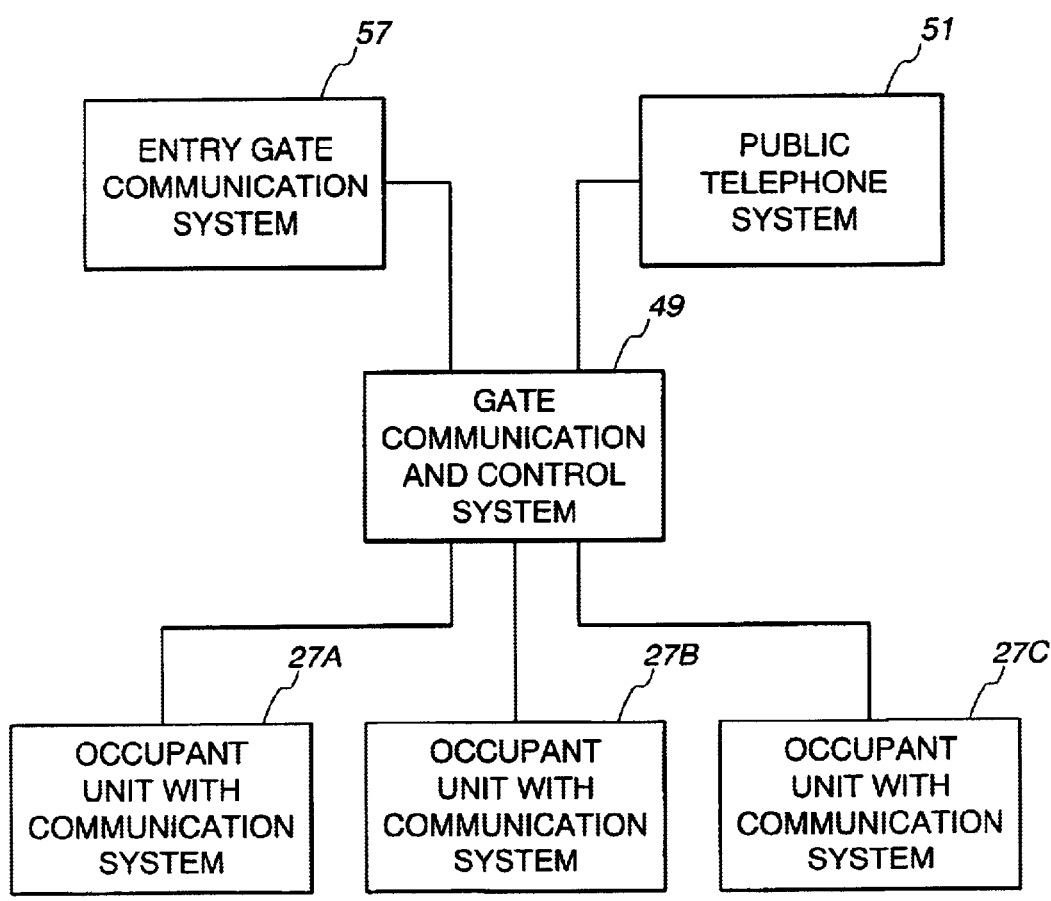
FIG. 3 is a schematic block diagram of the major functional units of the present invention.

A preferred embodiment of the basic system will have the functional units depicted in FIG. 3, a schematic block diagram. At the center of the system is the gate communication and control system 49 (GCCS). The public telephone system 51 will connect through the GCCS 49 to the various occupant units 27A, 27B, 27C etc. Also, the entry gate communication system 57, in a preferred embodiment, similar to the one depicted in FIG. 2 and described above will connect through the GCCS 49 to the various units 27A, 27B, 27C etc. This will allow the use of the same lines for the public telephone system and gate entry system in the complex. The entry gate and communication system 51, GCCS 49 and communication units (not shown) within each unit 27 could have their own communication lines separate from the public telephone system as noted above and the invention still practiced. However, by integrating the GCCS and entry gate communication system into the public telephone system within the complex, duplication of communication lines can be avoided and the telephones in each unit 27 can also be used to communicate with the entry gate communication system 53, i.e. unit 29 FIG. 2.

The system will function in a preferred embodiment as depicted in the flow chart of FIG. 4. First a visitor arriving at the gate will call a selected unit within the complex 71. The call is then received at the unit called 73. On receiving the call the system will determine if a pre-selected response from the unit has been set or not 75. If a pre-selected response from the unit has not been set, then the telephone or other communication unit in the unit will ring and the person answering the call will have four choices 77: 1) answer the call in their normal voice, 2) play a prerecorded message, which may include a request that the caller leave a message, 3) answer the phone using the voice shifting mode or 4) not answer the phone at all. The system can also be preprogrammed to provide for one automatically responding with one of the preceding four responses 79.

One of the unique features of the present invention is the inclusion of the option of the person answering with a voice shifting response. This entails changing the audio characteristics of the voice of the person answering the phone. This can be particularly important when a child or female household member is home alone and safety and security is important. Thus the audio characteristics of the voice could be shifted from that of a child or female to make it sound like an adult male. Consequently, an individual with ill intent or criminal intent who may try to use the fact the only occupants of a unit are children or females to further some nefarious activity would be led to believe that an adult male was in the unit and not try to do so. In the preferred embodiment, the voice shifting function would be accomplished using a Digital Signal Processor (DSP) wherein the incoming audio is first digitized, then filtered, and finally reconstructed with a different sampling rate to effect the shift in timber, pitch, and tone relative to the original voice.

The system of the present invention could be implemented in hardware or software. A separate hardware unit would be interposed within the system at some point between the communication device, i.e. telephone in each unit, and the gate entry communication system. Naturally, it would be controlled from each individual unit. In it simplest form the telephone in each unit could have an auxiliary device attached that would allow utilization by simply touching a button on the auxiliary unit. Alternatively, the communication system in the complex could have a computer system within the GCCS 49 that would implement the invention in software. Pushing the appropriate sequence of buttons on the telephone could activate the system.

The system of the present invention could be integrated with a video system that would allow the individual answering the telephone in the unit to see the person at the gate. This would provide the individual with further information on what would be the appropriate response from those set forth above.

While the invention has been particularly shown and described with reference to a preferred embodiment thereof, it will be understood by those skilled in the art that various changes in form and detail may be made to it without departing from the spirit and scope of the invention.

I claim:

1. An audio security system for a barrier entry communication system comprising:
   a) a movable security barrier that limits access to a restricted area to persons having appropriate authorization to enter the secured area;
   b) a barrier security apparatus operable to open said security barrier on activation after appropriate authorization;
   c) a first voice communication device located at said security barrier and whereby an individual at said security barrier desiring access to the restricted area can contact a location capable of granting authorization to enter the restricted area through said barrier using the public telephone system;
   d) a second voice communication device at a location within said restricted access area capable of granting authorization to enter, operatively connected to said first voice communication device using the public telephone system;
   e) a voice modification system available to said second voice communication device whereby a person at said second communication device when answering a call from said first voice communication device can modify the audio characteristics of an oral response and grant authorization to enter the secured area.

2. The system of claim 1 wherein the second communication device is a telephone connected to a public telephone system.

3. The system of claim 2 wherein said telephone connects into a public telephone system through said security system.

4. The system of claim 1 wherein modification of the audio characteristics with said modification system involves playing a recorded message on receipt of a call by said second voice communication device from said first voice communication device.

5. The system of claim 1 wherein modification of the audio characteristics with said modification system involves changing the tonal qualities of the person speaking on said second communication device to make it appear that the person speaking is an adult.

6. The system of claim 5 wherein modification of the audio characteristics with said modification system involves changing the tonal qualities of the person speaking on said second communication device to make it appear that the person speaking is an adult male.

7. The system of claim 1 wherein said barrier is a door.

8. The system of claim 1 wherein said barrier is a gate.

9. The system of claim 1 wherein a video image of a person calling from said first communication device is provided to a person using said second communication device.

10. An audio security system according to claim 1 wherein the voice modification system is disposed at the second voice communication device.

11. An audio security system according to claim 1 comprising a communication system for interconnecting the first voice communication device and the second voice communication device and the voice modification system is comprised by the communication system.

12. An audio security system according to claim 11 wherein the second voice communication device comprises apparatus for controlling the voice modification system.

13. An audio security system according to claim 1 wherein the second voice communication device comprises apparatus for preprogramming the voice modification system to automatically modify the audio characteristics of a response from the second communication device.

14. An audio security system according to claim 13 wherein the voice modification system is preprogrammed to play a recorded announcement.

15. An audio security system according to claim 13 wherein the voice modification system is preprogrammed to alter the voice of a user at the second voice communication device.

16. An audio security system according to claim 1 wherein the second voice communication device comprises apparatus under user control for selectively playing a pre-recorded announcement or altering the voice of the user.

* * * * *